Nov. 3, 1964     A. FETZKO     3,155,399
TRAILER TONGUE EXTENSION
Filed April 6, 1962
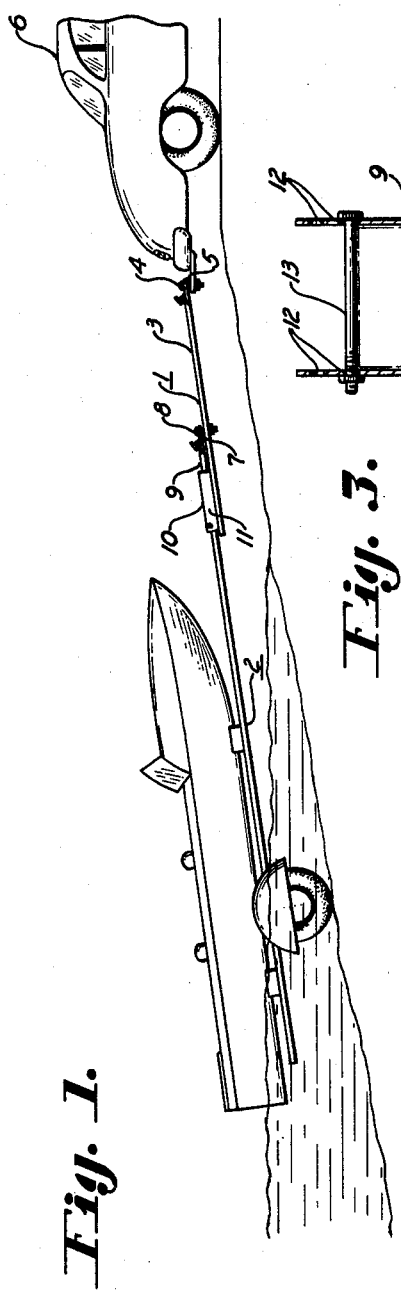
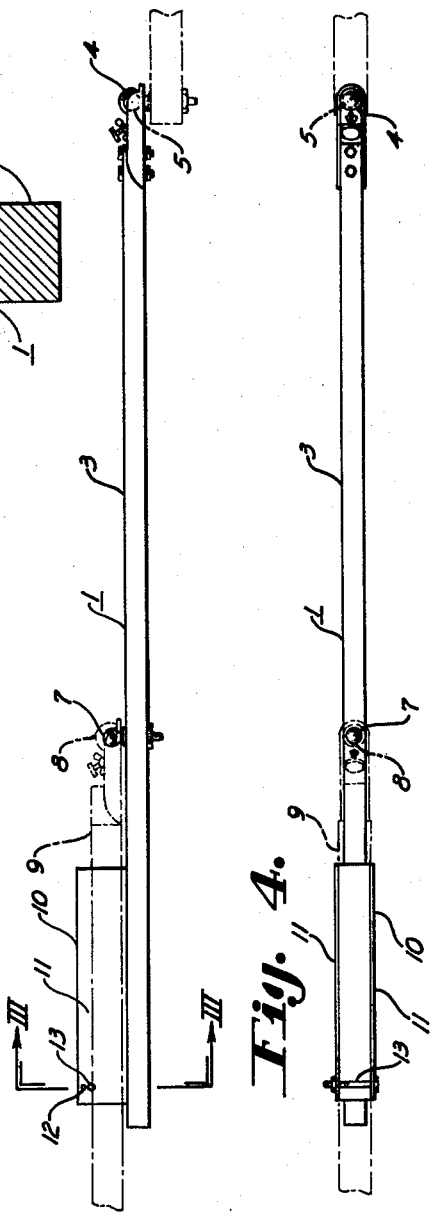
INVENTOR.
ANDREW FETZKO

United States Patent Office 3,155,399
Patented Nov. 3, 1964

3,155,399
TRAILER TONGUE EXTENSION
Andrew Fetzko, 607 Ann St., Homestead, Pa.
Filed Apr. 6, 1962, Ser. No. 185,587
2 Claims. (Cl. 280—482)

This invention relates to extenders for trailer tongues and more particularly to extenders for the tongues of boat trailers.

One of the most vexing problems with boat trailers arises when launching or recovering a boat from a trailer at the water's edge because it is necessary to back the trailer sufficiently close to or into the body of water to float the boat. As often as not this means backing the vehicle or car towing the trailer right up to the water's edge and even into the water. The likelihood of getting the vehicle stuck at or near the water's edge is far greater than even just a few feet from the edge on dry shore. The foregoing problem is well known to boat and boat trailer owners, and it has been generally recognized that the problem can be substantially alleviated by extending the length of the trailer tongue so that it is not necessary to back the vehicle so close to the waterline. Extenders for this purpohe have been heretofore proposed such, for example, as shown and described in United States Patent Nos. 2,844,389 to C. L. Burnett and 2,856,087 to C. R. Steber. I have found, however, that the solutions heretofore proposed have been objectionable and impractical either because of their complicated structure and resulting higher cost or because they were too difficult to control or use.

For example, I have found that telescopic extenders are not only costly to fabricate but are readily subject to damage which renders them troublesome or even useless. For instance telescoping type extenders tend to become bent or warped in time and when this occurs the extender will not telescope and generally becomes jammed in the receiving end so that it cannot be moved in or out. Other extenders are not rigid or rigidly attached to the trailer tongue and are therefore extremely difficult to handle when backing to the waterline with the boat trailer, usually requiring a couple of men, in addition to the driver, to steer the trailer. Other extenders have locking pins that become jammed or have dollies that require maintenance.

I have devised a trailer tongue extender that is so simplified there is little or nothing that can go wrong with it; that is inexpensive and simple to operate and yet accomplishes the purpose for which it is provided so well that it is the most practical solution to this problem of any heretofore known or proposed extender.

I provide a trailer tongue extender comprising a tongue member having hitch means disposed at one end thereof for cooperation with hitch means disposed on a vehicle bumper, a hitch element such as a hitch ball disposed near the other end thereof for cooperative engagement with the hitch means disposed on the trailer tongue, trailer tongue receiving means disposed on said tongue member between said hitch ball and said other end, said trailer tongue receiving means being of a configuration to snugly receive said trailer tongue therein and having closure means whereby said trailer tongue is substantially immovably retained therein when the hitch means of said trailer tongue is engaged with said hitch ball.

Preferably the aforementioned trailer tongue receiving means comprises a U-shaped trough member the sides of which extend above the trailer tongue snugly disposed therein and having a plurality of openings therein for bolt closure means extending across the U-opening thereof so that said trailer tongue is substantially immovably retained therein when the hitch means of the trailer tongue is engaged with said hitch ball.

Other details, objects and adavntages of my invention will become apparent as the following description of a present preferred embodiment thereof proceeds.

In the accompanying drawing, I have shown a present preferred embodiment of the invention in which FIGURE 1 is a side elevational view of my trailer tongue extender being utilized with a boat trailer and automobile;

FIGURE 2 is an enlarged side elevational view of the present invention;

FIGURE 3 is an enlarged transverse cross-sectional view taken on the line III—III of FIGURE 2; and FIGURE 4 is a top plan view of my invention.

Referring to the drawing, and initially to FIGURE 1, I have therein illustrated my extender 1 in use with a boat trailer 2. Extender 1 comprises a tongue member 3 having a coupler such as hitch socket 4 at one end thereof for cooperative engagement with a coupler such as hitch ball 5 secured to the vehicle 6 towing the trailer. Another coupler, such as hitch ball 7, is secured to tongue member 3 near the end removed from hitch socket 4. Hitch ball 7 is adapted for cooperative engagement with a coupler such as hitch socket 8 disposed on the end of trailer tongue 9. Disposed between hitch ball 7 and the end of tongue member 3 removed from hitch socket 4 is a trailer tongue receiving means such as the U-shaped trough member 10 shown. As is shown most clearly in FIGURE 3, the U opening of trough member 10 is such that trailer tongue 9 is snugly received when therein disposed. Trough member 10 also has closure means. As shown in FIGURES 2 and 3, I provide that the sides 11, of trough member 10 have upper portions extending above trailer tongle 9 when disposed therein. I also preferably provide the openings 12 in said upper portions of sides 11 into which the bolt 13 is secured. Preferably, openings 12 and bolt 13 are disposed as nearly adjacent trailer tongue 9 disposed in trough 10 as is practical for hand assembly so that when trailer tongue 9 is disposed in trough member 10 with bolt 13 locked in place and with hitch socket 8 in cooperative engagement with hitch ball 7, trailer tongue 9 is substantially immovably retained therein. Thus a trailer tongue with my extender 1 attached reacts quite normally when backing the trailer to the water's edge which is much simpler and easier for the driver of the vehicle than with the non-rigid type extenders earlier discussed.

Extender 1 is also easily removed by simply removing bolt 13 and disengaging hitch sockets 4 and 8 from hitch balls 5 and 7 respectively, and can be stored or carried on trailer 2.

It is thus apparent that my extender is not only admirably effective for its purpose but is so startlingly simple and devoid of parts to go wrong that it is more practical and thus useful than any trailer tongue extender heretofore known.

While I have shown and described a present preferred embodiment of the invention, it is to be distinctly understood that the invention is not limited thereto but may be otherwise variously embodied within the scope of the following claims.

I claim:

1. A trailer tongue extender comprising a tongue member having hitch socket means disposed at one end thereof, a hitch ball element disposed near the other end thereof for cooperative engagement with the hitch socket means of a trailer tongue, trailer tongue receiving means disposed on said tongue member between said hitch ball element and said other end, said receiving means being U-shaped to snugly receive said trailer tongue therein and having lockable closure means across the U opening thereof whereby said trailer tongue is substantially immovably retained therein when the hitch socket means of said trailer tongue is cooperatively engaged with said hitch ball element.

2. A trailer tongue extender comprising a tongue member having hitch socket means disposed at one end thereof, a hitch ball element disposed near the other end thereof for cooperative engagement with the hitch socket means of trailer tongue, trailer tongue receiving means disposed on said tongue member between said hitch ball element and said other end, said receiving means comprising a U-shaped trough member adapted to snugly receive said trailer tongue therein, the sides of said trough member extending above the trailer tongue disposed therein and having a plurality of openings therein for bolt closure means extending across the U opening thereof whereby said trailer tongue is substantially immovably retained therein when the hitch socket means of said trailer tongue is cooperatively engaged with said hitch ball element.

References Cited in the file of this patent
UNITED STATES PATENTS

| | | |
|---|---|---|
| 2,515,705 | Gardiner | July 18, 1950 |
| 2,844,389 | Burnett | July 22, 1958 |
| 2,912,274 | Falkner | Nov. 10, 1959 |